US010866385B2

(12) United States Patent
Hu et al.

(10) Patent No.: US 10,866,385 B2
(45) Date of Patent: Dec. 15, 2020

(54) OPTICAL SYSTEM

(71) Applicant: TDK TAIWAN CORP., Yangmei Taoyuan (TW)

(72) Inventors: Chao-Chang Hu, Yangmei Taoyuan (TW); Chih-Wei Weng, Yangmei Taoyuan (TW); Shao-Kuang Huang, Yangmei Taoyuan (TW); Sin-Jhong Song, Yangmei Taoyuan (TW)

(73) Assignee: TDK Taiwan Corp., Yangmei Taoyuan (TW)

( * ) Notice: Subject to any disclaimer, the term of this patent is extended or adjusted under 35 U.S.C. 154(b) by 239 days.

(21) Appl. No.: 15/977,221

(22) Filed: May 11, 2018

(65) Prior Publication Data
US 2018/0329173 A1 Nov. 15, 2018

Related U.S. Application Data

(60) Provisional application No. 62/505,420, filed on May 12, 2017.

(30) Foreign Application Priority Data

May 7, 2018 (CN) .......................... 2018 1 0425973

(51) Int. Cl.
G02B 7/10 (2006.01)
G02B 7/09 (2006.01)
H04N 5/225 (2006.01)
G02B 27/64 (2006.01)
H04N 5/232 (2006.01)

(52) U.S. Cl.
CPC ............... G02B 7/102 (2013.01); G02B 7/09 (2013.01); G02B 27/646 (2013.01); H04N 5/2254 (2013.01); H04N 5/2258 (2013.01); H04N 5/23287 (2013.01)

(58) Field of Classification Search
CPC ........ G02B 7/102; G02B 7/09; H04N 5/2254; H04N 5/2258
See application file for complete search history.

(56) References Cited

U.S. PATENT DOCUMENTS

| 2005/0018314 | A1* | 1/2005 | Yamaguchi | G02B 1/041 359/676 |
| 2016/0044250 | A1* | 2/2016 | Shabtay | H04N 5/247 348/240.3 |
| 2016/0191812 | A1* | 6/2016 | Tsubusaki | H04N 5/23293 348/240.1 |
| 2016/0282580 | A1* | 9/2016 | Koyama | G02B 7/08 |
| 2017/0235095 | A1* | 8/2017 | Sekimoto | G02B 7/09 359/824 |
| 2018/0164661 | A1* | 6/2018 | Sekimoto | G03B 5/04 |

* cited by examiner

Primary Examiner — William R Alexander
Assistant Examiner — Ephrem Z Mebrahtu
(74) Attorney, Agent, or Firm — Muncy, Geissler, Olds & Lowe, P.C.

(57) ABSTRACT

An optical system is provided and includes a fixed part, a first optical member holder, a second optical member holder and a first driving assembly. The first optical member holder is configured to hold a first optical member and is disposed over the fixed part. The second optical member holder is configured to hold a second optical member and is movably connected to the first optical member holder. The first driving assembly is configured to drive the first optical member holder to move relative to the fixed part.

16 Claims, 13 Drawing Sheets

OPTICAL SYSTEM

CROSS REFERENCE TO RELATED APPLICATIONS

This application claims the benefit of U.S. Provisional Application No. 62/505,420, filed May 12, 2017, and China Patent Application No. 201810425973.8, filed May 7, 2018, the entirety of which are incorporated by reference herein.

BACKGROUND OF THE DISCLOSURE

Field of the Disclosure

The present disclosure relates to an optical system, and more particularly to an optical system that has a function of optical image stabilization and can compensate for tilting of an optical lens in the optical system.

Description of the Related Art

As technology has progressed, many kinds of electronic devices such as smartphones and tablet computers have begun to include the functionality of digital photography and recording video. A user can operate the electronic device to capture various images through a camera module included in the electronic device.

In general, when using the electronic device, the camera module therein may vibrate due to an external shock or impact, which can blur the images captured by the camera module. Therefore, the camera module of the electronic device can have such functions as auto focusing and optical image stabilization. When the auto focusing function is executed, a current is supplied to the coil, and electromagnetic induction occurs between the coil and the corresponding magnets, so that a lens holder affixed to the coil is moved along an optical axis (i.e. along the Z direction) of the lens, thereby performing an auto focusing function. Moreover, electromagnetic induction can also occur between the coils and the magnets, corresponding to the X-axis and Y-axis directions, so as to correct the position of the lens (i.e. correct the horizontal offset of the optical axis in the X-axis and Y-axis directions). Consequently, the electronic device is shockproof and image quality is improved.

However, when the conventional electronic device is used, the vibration of the camera module therein is actually more complicated, rather than being offset along the vertical direction and the horizontal direction. Therefore, how to design an electronic device and a camera module with better shockproof effect is a topic nowadays that needs to be discussed and solved.

BRIEF SUMMARY OF THE DISCLOSURE

Accordingly, one objective of the present disclosure is to provide an optical system having a plurality of driving assemblies, so as to solve the above problems.

According to some embodiments of the disclosure, an optical system includes a fixed part, a first optical member holder, a second optical member holder and a first driving assembly. The first optical member holder is configured to hold a first optical member and is disposed on the fixed part. The second optical member holder is configured to hold a second optical member and is movably connected to the first optical member holder. The first driving assembly is configured to drive the first optical member holder to move relative to the fixed part.

According to some embodiments, the second optical member holder, the second optical member and the fixed part define an enclosed space, and the enclosed space is located between the second optical member and the light-sensing module. In addition, the first optical member is located between the second optical member and the fixed part.

According to some embodiments, the second optical member is fixedly connected to the fixed part. In addition, the optical system further includes an elastic member, wherein the first optical member holder is movably connected to the fixed part through the elastic member. In addition, the elastic member includes a long-strip structure, and the elastic member is extended to be connected to the base along a first optical axis direction of the first optical member. In addition, when viewed along a direction which is perpendicular to the first optical axis direction, the elastic member partially overlaps the first optical member and the second optical member.

According to some embodiments, the optical system further includes an optical path adjustment member, and the optical path adjustment member, the first optical member and the second optical member are arranged along a first optical axis direction of the first optical member.

According to some embodiments, the first driving assembly is configured to drive the first optical member holder to move along a first optical axis direction of the first optical member.

According to some embodiments, the first driving assembly is configured to control a distance between a first optical axis of the first optical member and a second optical axis of the second optical member. In addition, the first driving assembly is configured to control an included angle between a first optical axis of the first optical member and a second optical axis of the second optical member.

According to some embodiments, the optical system further includes plurality of first optical members, disposed on the first optical member holder. In addition, the optical system further includes a plurality of second optical members, disposed on the second optical member holder. In addition, the second optical members are bigger than the first optical members. In addition, some of the first optical members are made of plastic material. In addition, some of the first optical members are made of glass material.

According to some embodiments, the optical system further includes a second driving assembly, configured to drive the second optical member holder to move relative to the fixed part. In addition, the optical system further includes a magnetic isolation member, disposed between the first and second driving assemblies.

According to some embodiments, the optical system further includes a light quantity control unit, disposed between the first optical member holder and the second optical member holder.

The present disclosure provides an optical system that includes a first optical member holder, a second optical member holder and a first driving assembly. The first optical member holder and the second optical member holder are configured to respectively hold a plurality of first optical members and a plurality of second optical members. In some embodiments, some of the first optical members are made of plastic material, and the second optical members are made of glass material. Because the first optical members made of plastic are lighter in weight, the first driving assembly can effectively drive the first optical member holder and the first optical members to move relative to the fixed part.

In addition, the first driving assembly is configured to drive the first optical member holder to move along the first optical axis direction and/or to control the distance between the first optical axis of the first optical members and the second optical axis of the second optical members and/or to control the included angle between the first optical axis and the second optical axis. Therefore, when the optical system is shaken, the first driving assembly can immediately help the first optical axis to be aligned with the second optical axis, so that the light-sensing module can generate a clear digital image, so as to achieve the purpose of optical image stabilization.

In some embodiments of the present disclosure, the optical system can further include a second driving assembly which is configured to drive the second optical member holder to move along the first optical axis relative to the fixed part. Therefore, the optical system can perform the auto focusing function while performing the zoom function. In addition, in this embodiment, the optical system can further include a plurality of magnetic isolation members which are disposed between the first driving assembly and the second driving assembly, so as to prevent the problem of magnetic interference between the first driving assembly and the second driving assembly.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
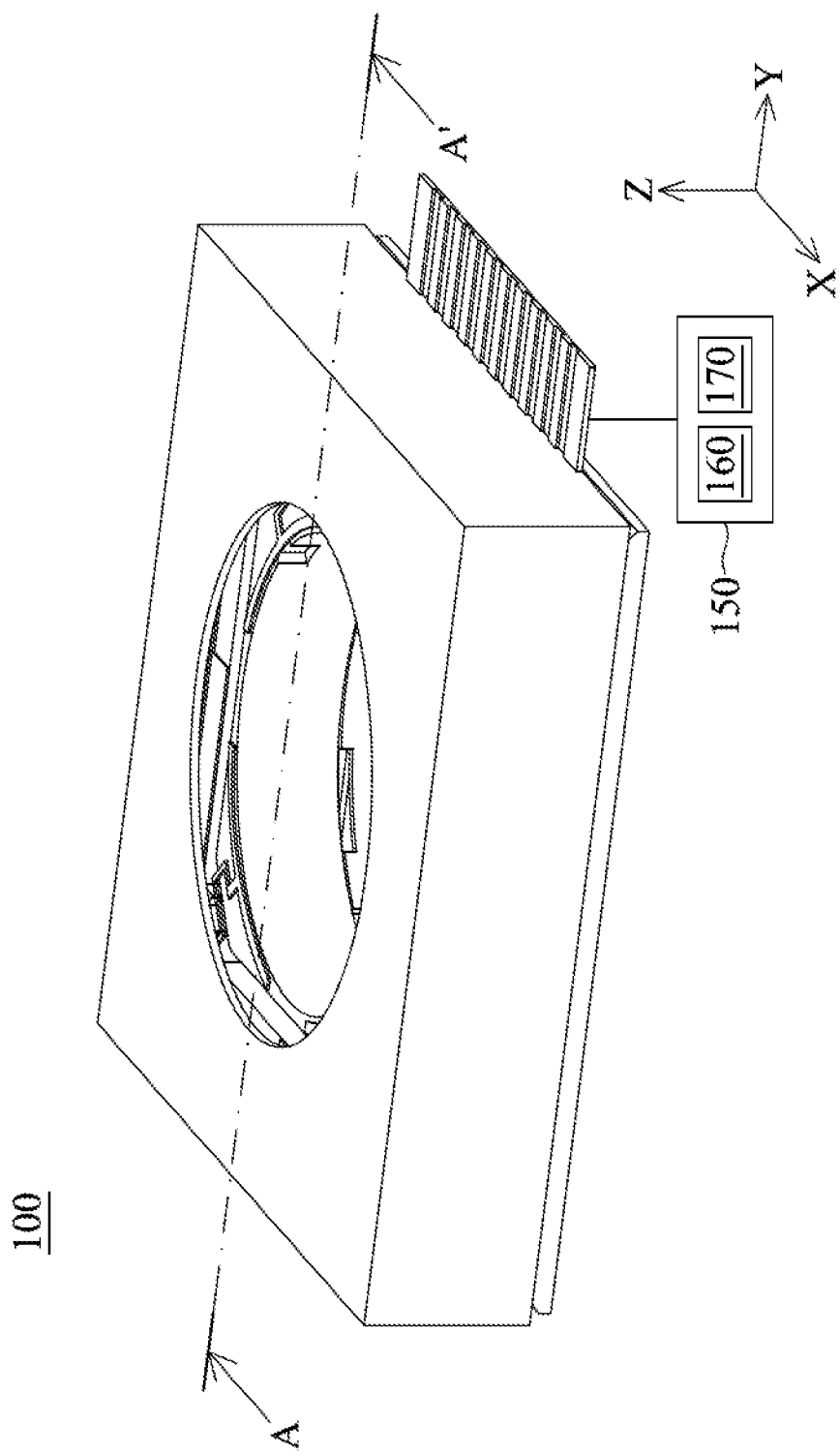
FIG. 1 shows a schematic diagram of an optical system installed on a portable electronic device according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
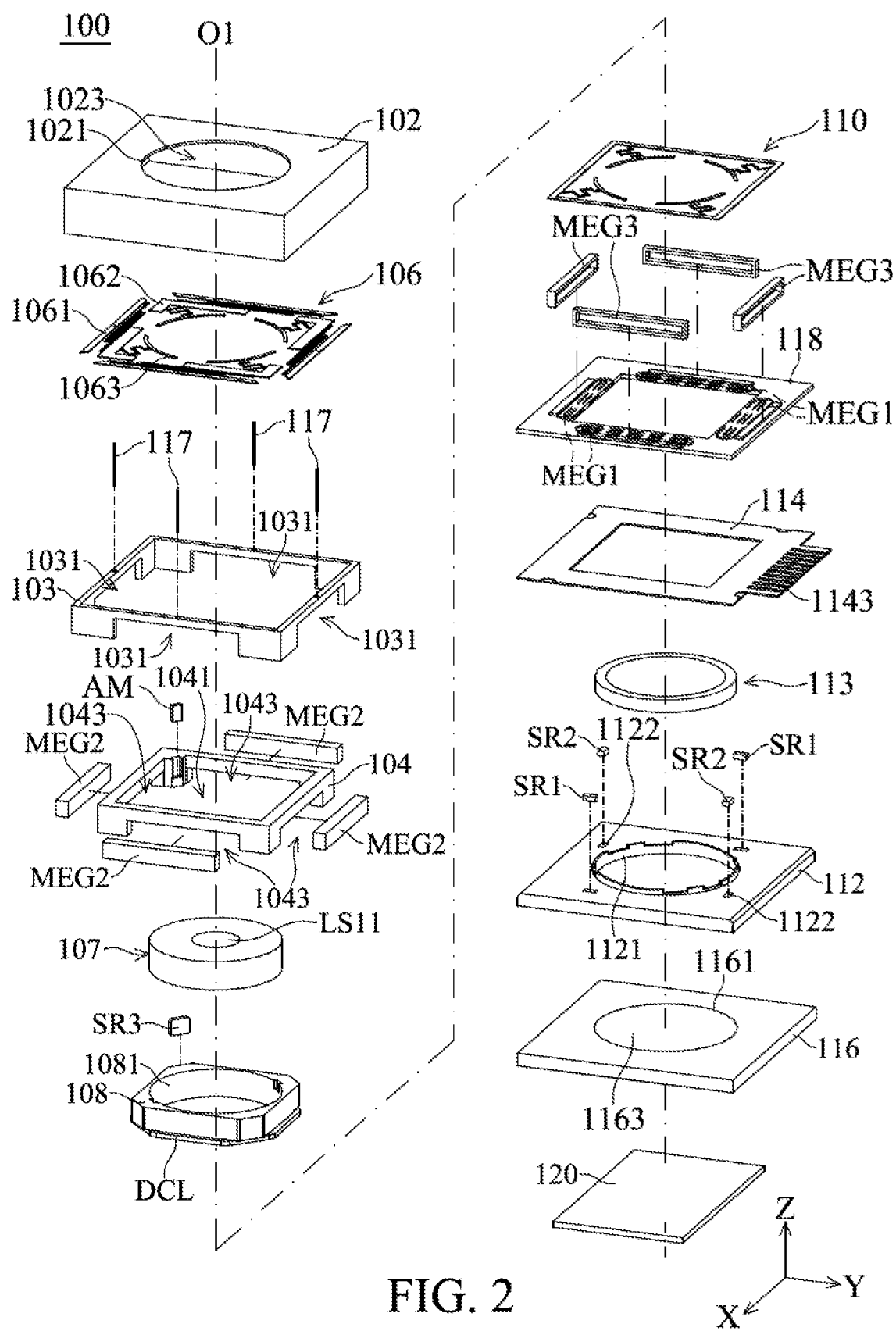
FIG. 2 shows an exploded diagram of the optical system according to the embodiment of the present disclosure.
Figure 3:
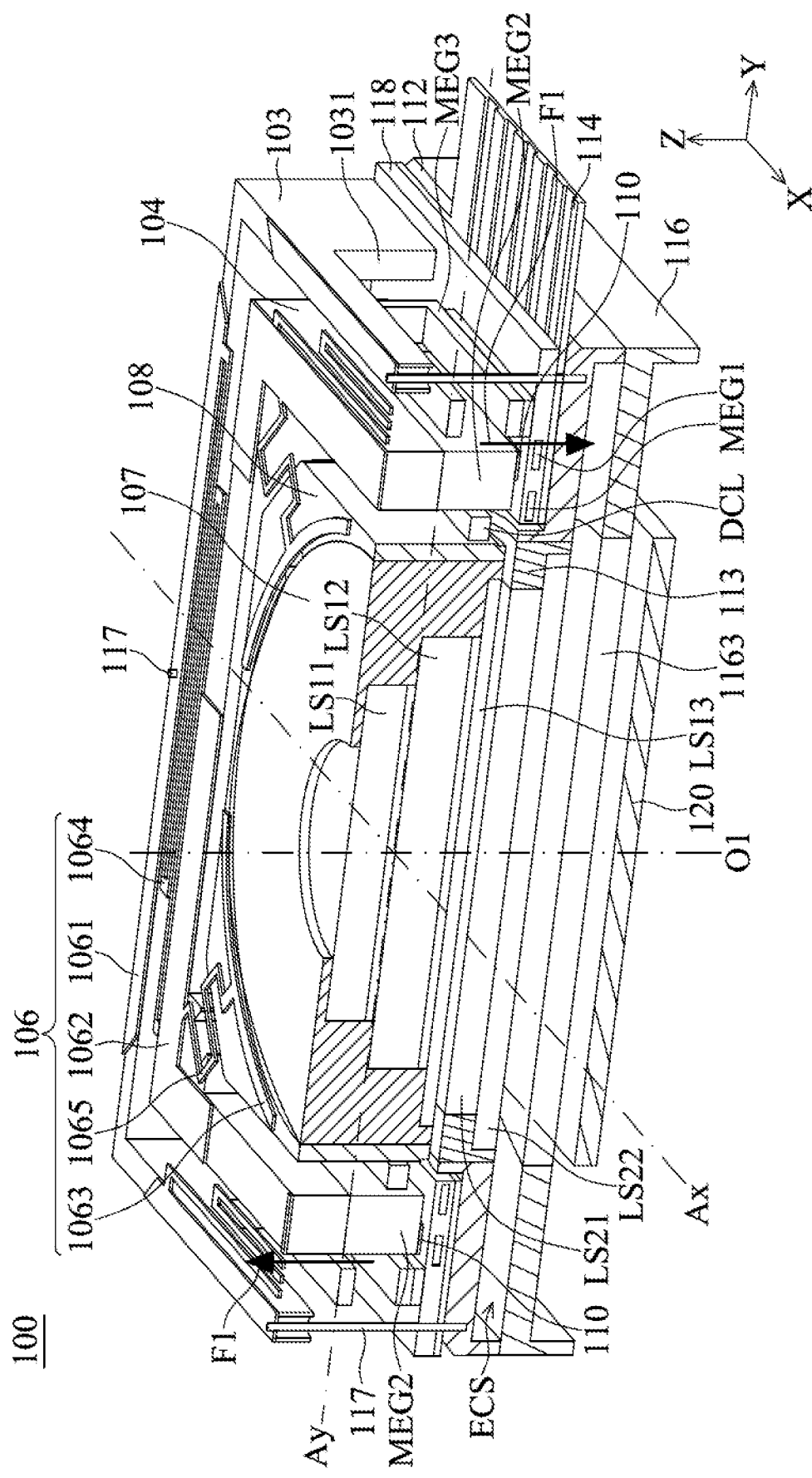
FIG. 3 shows a cross-sectional view along line A-A' in FIG. 1 according to the embodiment of the present disclosure.

Please refer to FIG. 1 to FIG. 3. FIG. 1 shows a schematic diagram of an optical system 100 according to an embodiment of the present disclosure, FIG. 2 shows an exploded diagram of the optical system 100 according to the embodiment of the present disclosure, and FIG. 3 shows a cross-sectional view along line A-A' in FIG. 1 according to the embodiment of the present disclosure. The optical system 100 can be a camera system with one or more driving assemblies and can be configured to hold one or more optical members (such as a lens). The optical system 100 can be installed in different electronic devices or portable electronic devices, such as a smartphone or a tablet computer, for allowing a user to perform the image capturing function. In this embodiment, the driving assembly can be a voice coil motor (VCM) with an auto-focusing (AF) function, but it is not limited thereto. In some embodiments, the driving assembly of the optical system 100 can also perform the functions of auto-focusing, optical image stabilization (OIS), static tilt compensation and dynamic tilt compensation.

In addition, as shown in FIG. 1, the optical system 100 can also include a control unit 150. The control unit 150 can include a processor 160 and a storage unit 170. In this embodiment, the processor 160 can be a microprocessor, and the storage unit 170 can be any form of storage medium (such as random access memory) for storing data related to the optical system 100. The processor 160 in the control unit 150 is configured to control the driving assembly mentioned above according to the data stored in the storage unit 170. The control unit 150 is not limited to the implementation means described above. For example, the control unit 150 can also be a control chip.

Please refer to FIG. 1 to FIG. 3 together. In this embodiment, as shown in FIG. 2, the optical system 100 includes a casing 102, an outer frame 103, an inner frame 104, a top spring sheet 106, a first optical assembly 107, a first optical member holder 108, a driving coil DCL, a lower spring sheet 110, a plurality of first magnetic elements MEG1, a plurality of second magnetic elements MEG2, a plurality of third magnetic elements MEG3, a plurality of elastic members 117, a sensing unit, a circuit board 114, a circuit board 118, a second optical assembly 113, a second optical member holder 112, a base 116, and a light-sensing module 120 (the control unit 150 is omitted in FIG. 2). In this embodiment, the casing 102, the circuit board 114, the circuit board 118, and the base 116 can be defined as a fixed part. In addition, the first optical member holder 108, the outer frame 103, and inner frame 104 can be defined as a movable part which can move relative to the fixed part.

As shown in FIG. 2, the casing 102 has a hollow structure, and an opening 1021 is formed on the casing 102. In addition, a base opening 1161 is formed on the base 116. The center of the opening 1021 corresponds to a first optical axis O1 of a first optical member LS11 in the first optical assembly 107, and the base opening 1161 corresponds to the light-sensing module 120 disposed below the base 116. The casing 102 can have an accommodating space 1023 for accommodating the top spring sheet 106, the outer frame 103, the inner frame 104, the first optical member holder 108, the driving coil DCL, the second magnetic elements MEG2, and the third magnetic elements MEG3, the circuit board 118 and so on. In this embodiment, the driving coil DCL, the first magnetic elements MEG1, the second magnetic elements MEG2, and the third magnetic elements MEG3 can be defined as a first driving assembly. The first driving assembly is electrically connected to the circuit board 114, and the first driving assembly is configured to drive the first optical member holder 108 to move relative to the fixed part.

As shown in FIG. 2, the first optical member holder 108 has a hollow ring structure and has a through hole 1081. The through hole 1081 forms a threaded structure (not shown) corresponding to another threaded structure (not shown) on the first optical assembly 107, such that the first optical assembly 107 can be locked in the through hole 1081. Similarly, the second optical member holder 112 has a through hole 1121. The through hole 1121 forms a threaded structure corresponding to another threaded structure on the second optical assembly 113, such that the second optical assembly 113 can be locked in the through hole 1121. In addition, the first optical assembly 107 includes a first optical member LS11, and the first optical member LS11 can define a first optical axis O1.

Furthermore, as shown in FIG. 2, in this embodiment, the inner frame 104 has an opening 1041 and a plurality of grooves 1043. The opening 1041 is configured to accommodate the first optical member holder 108, and the grooves 1043 are configured to accommodate the four second magnetic elements MEG2. It should be noted that the number of the grooves 1043 and the second magnetic elements MEG2 is not limited to this embodiment. In this embodiment, the shape of the second magnetic element MEG2 can include a long-strip structure, but it is not limited thereto. For example, it can include different shapes in other embodiments. In addition, the second magnetic element MEG2 can be a multi-pole magnet.

As shown in FIG. 2 and FIG. 3, the driving coil DCL is disposed around the first optical member holder 108 and corresponds to the four second magnetic elements MEG2. When the driving coil DCL is provided with electricity, the four second magnetic elements MEG2 act with the driving coil DCL to generate an electromagnetic driving force, so as to drive the first optical member holder 108 to move relative to the inner frame 104 along the first optical axis O1 direction (i.e., a direction of the first optical axis O1, the Z-axis direction), so that the auto focusing function is performed. In addition, as shown in FIG. 2 and FIG. 3, the first magnetic elements MEG1 can be plate coils which are disposed within the circuit board 118 and correspond to the second magnetic elements MEG2.

As shown in FIG. 2 and FIG. 3, the outer frame 103 surrounds the inner frame 104 and includes four notches 1031, and the optical system 100 includes four elastic members 117 that respectively pass through the four notches 1031. Specifically, the elastic member 117 includes a long-strip structure, and the elastic member 117 is extended along the first optical axis O1 direction. One end of the elastic member 117 is connected to the outer frame 103 and the top spring sheet 106, and the other end of the elastic member 117 is fixedly connected to the circuit board 118 and the second optical member holder 112. In addition, the other end of the elastic member 117 can also be fixedly connected to the base 116. Furthermore, it should be noted that the elastic member 117 is connected to the first optical member holder 108 through the top spring sheet 106, and there is no relative movement between the first optical member holder 108 and the elastic members 117.

In this embodiment, the circuit board 114 can be a flexible printed circuit (FPC) board, but it is not limited thereto. As shown in FIG. 1 and FIG. 2, the circuit board 114 includes a plurality of electrical contacts 1143, configured to connect a main circuit board (not shown) and the control unit 150 of the aforementioned electronic device. In addition, the circuit board 118 is disposed on the circuit board 114, and the first magnetic elements MEG1 are electrically connected to the circuit board 114.

As shown in FIG. 2 and FIG. 3, in this embodiment, the sensing unit can include two first sensors SR1, two second sensors SR2, and one third sensor SR3. The first sensors SR1 and the second sensors SR2 can be fixedly disposed in accommodating slots 1122 of the second optical member holder 112, but they are not limited thereto. For example, they can also be disposed on the circuit board 114 corresponding to the first magnetic elements MEG1. The first sensors SR1 and the second sensors SR2 are configured to sense the movement of the corresponding second magnetic elements MEG2. In addition, the third sensor SR3 is disposed at a corner of the first optical member holder 108 and is configured to sense a magnet AM. The magnet AM is fixedly disposed on the inner frame 104 corresponding to the third sensor SR3 on the first optical member holder 108. The positions of the magnet AM and the third sensor SR3 are not limited to this embodiment. In this embodiment, the first sensor SR1, the second sensor SR2, or the third sensor SR3 can be a magnetic field sensing element, such as a Hall effect sensor, a MR sensor, a fluxgate sensor, and so on, but they are not limited thereto.

In this embodiment, the first optical member holder 108 and the first optical assembly 107 are disposed in the inner frame 104 and are movable relative to the inner frame 104.

More specifically, as shown in FIG. 3, the first optical member holder 108 can be connected to the inner frame 104 by the top spring sheet 106 and the lower spring sheet 110, so that the first optical member holder 108 is suspended in the inner frame 104. In addition, the first optical member holder 108 and the inner frame 104 are suspended in the outer frame 103 by the top spring sheet 106. Moreover, based on the configuration of the four elastic members 117 and the top spring sheet 106, when the first magnetic elements MEG1 are provided with electricity, the first magnetic elements MEG1 act with the corresponding second magnetic elements MEG2 to generate an electromagnetic driving force, so at to drive the first optical member holder 108, the inner frame 104, and the outer frame 103 to move relative to the circuit board 118 along the X-Y plane. Therefore, when the optical system 100 is shaken, the first optical member holder 108 can be driven to move along the X-Y plane by the electromagnetic driving force, so as to achieve the purpose of optical image stabilization.

In this embodiment, as shown in FIG. 3, the top spring sheet 106 and the lower spring sheet 110 can be elastic members, and the top spring sheet 106 can include an outer ring portion 1061, a middle ring portion 1062, an inner ring portion 1063, a plurality of connecting portions 1064, and a plurality of connecting portions 1065. The inner ring portion 1063 is fixedly connected to the first optical member holder 108, the middle ring portion 1062 is fixedly connected to the inner frame 104, and the outer ring portion 1061 is fixedly connected to the outer frame 103. Furthermore, the inner ring portion 1063 is connected to the middle ring portion 1062 by the connecting portions 1065, and the middle ring portion 1062 is connected to the outer ring portion 1061 by the connecting portions 1064.

It should be noted that the outer ring portion 1061, the middle ring portion 1062 and the inner ring portion 1063 have a greater elastic coefficient than the connecting portions 1064 and the connecting portions 1065, so that when the driving coil DCL is provided with electricity to act with the second magnetic elements MEG2 to generate an electromagnetic driving force to drive the first optical member holder 108 to move relative to the inner frame 104 along the first optical axis O1 direction (Z-axis direction), it can ensure that the first optical member holder 108 does not easily rotate relative to the inner frame 104. In addition, the lower spring sheet 110 is configured to help the first optical member holder 108 to be more stably suspended in the inner frame 104.

In addition, as shown in FIG. 3, the first optical assembly 107 can include one or more first optical members. For example, the first optical assembly 107 can include a first optical member LS11, a first optical member LS12, and a first optical member LS13. The second optical assembly 113 can include one or more second optical members, such as a second optical member LS21 and a second optical member LS22. In this embodiment, the first optical members and the second optical members can be lenses, and the size of the second optical members is bigger than that of the first optical members. For example, the second optical member LS22 is bigger than the first optical member LS11 and the first optical member LS12. In this embodiment, some of the first optical members are made of plastic material, and other parts of the first optical members are made of glass material and the second optical members are made of glass material. For example, the first optical member LS11 and the first optical member LS12 are made of plastic material, and the first optical member LS13 is made of glass material. The material of the first optical members and the second optical members is not limited to this embodiment. For example, at least one of the second optical members can also be made of plastic material.

Please continue to refer to FIG. 3, in this embodiment, the second optical assembly 113 is fixedly connected to the second optical member holder 112, and second optical member holder 112 is fixedly connected to the base 116. That is, the second optical members in the second optical assembly 113 are fixedly connected to the fixed part. In addition, as shown in FIG. 2 and FIG. 3, an optical filter 1163 can be disposed in the base opening 1161 of the base 116, and the optical filter 1163 is configured to filter the light entering the optical system 100. In addition, the second optical member holder 112, the second optical member LS22 and the base 116 can define an enclosed space ECS. As shown in FIG. 3, the enclosed space ECS is located between the second optical member LS22 and the light-sensing module 120. Based on the configuration of the enclosed space ECS, particles resulting from the operations of various members in the optical system 100 can be prevented from falling onto the light-sensing module 120.

Figure 4:
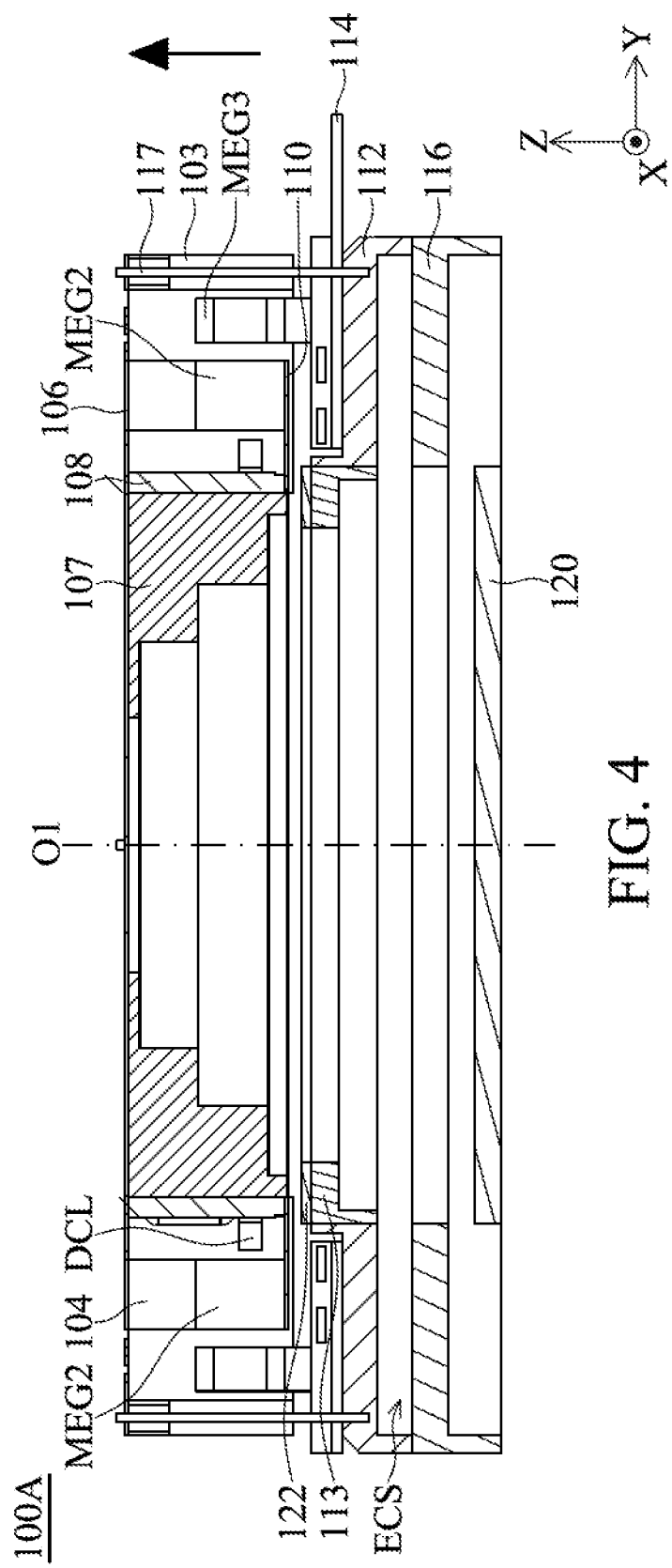
FIG. 4 shows a cross-sectional view of an optical system according to another embodiment of the present disclosure.

Please refer to FIG. 4, which shows a cross-sectional view of an optical system 100A according to another embodiment of the present disclosure. In contrast to the optical system 100 of the previous embodiment, the optical system 100A of this embodiment can further include a light quantity control unit 122 which is disposed between the first optical member holder 108 and the second optical member holder 112, and the light quantity control unit 122 is configured to control quantity of the light which is received by the light-sensing module 120. In addition, as shown in FIG. 4, the elastic members 117 partially overlaps the first optical members and the second optical members when viewed along a direction (such as along the Y-axis direction) which is perpendicular to the first optical axis O1 direction.

Figure 5:
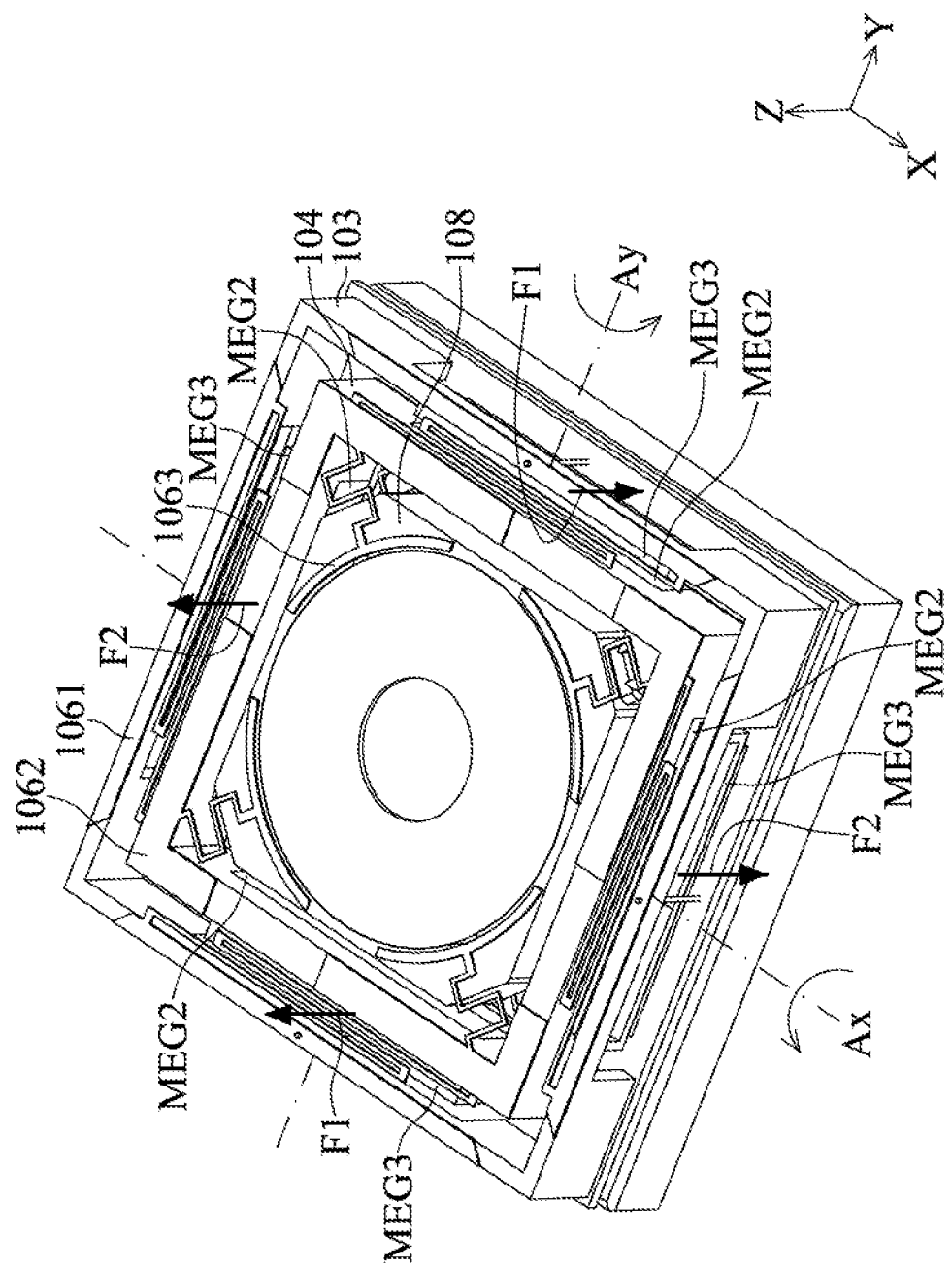
FIG. 5 shows a schematic diagram of the optical system in another view according to the embodiment of the present disclosure.

Please refer to FIG. 3 and FIG. 5. FIG. 5 shows a schematic diagram of the optical system 100 in another view according to the embodiment of the present disclosure. For clarity, the casing 102 is omitted in FIG. 5. As shown in FIG. 3, a first axis Ax and a second axis Ay can be defined between the top spring sheet 106 and the lower spring sheet 110, directions of the first axis Ax and the second axis Ay are respectively parallel to the X-axis direction and the Y-axis direction, and directions of the first axis Ax and the second axis Ay are perpendicular to the first optical axis O1. More specifically, the first axis Ax and the second axis Ay are crossed with the first optical axis O1. It should be noted that the first axis Ax and the second axis Ay pass through the first optical member holder 108.

In addition, as shown in FIG. 3 and FIG. 5. The control unit 150 in FIG. 1 can control only two second magnetic elements MEG2 and two third magnetic elements MEG3 (coils) arranged along the Y-axis direction to generate two electromagnetic driving forces F1. In this embodiment, the two electromagnetic driving forces F1 have the same magnitude but opposite directions. Next, as shown in FIG. 5, because the first optical member holder 108 and the inner frame 104 are respectively connected to the inner ring portion 1063 and the middle ring portion 1062, when the two electromagnetic driving forces F1 are generated, the inner frame 104 and the first optical member holder 108 are driven to rotate around the first axis Ax relative to the outer frame 103. That is, the inner ring portion 1063 and the middle ring portion 1062 are rotated relative to the outer ring portion 1061 around the first axis Ax.

Similarly, as shown in FIG. 5, the control unit 150 can control only two second magnetic elements MEG2 and two third magnetic elements MEG3 arranged along the X-axis direction to generate two electromagnetic driving forces F2. In this embodiment, the two electromagnetic driving forces F2 have the same magnitude but opposite directions. As shown in FIG. 5, the two electromagnetic driving forces F2 can drive the inner ring portion 1063 and the middle ring portion 1062 to rotate around the second axis Ay relative to the outer ring portion 1061. That is, the electromagnetic driving forces F2 can drive the inner frame 104 and the first optical member holder 108 to rotate around the second axis Ay relative to the outer frame 103. It should be noted that the control unit 150 can only control the first driving assembly to generate a single electromagnetic driving force F1 or a single electromagnetic driving force F2 to drive the first optical member holder 108 and the inner frame 104 to rotate relative to the outer frame 103.

Figure 6:
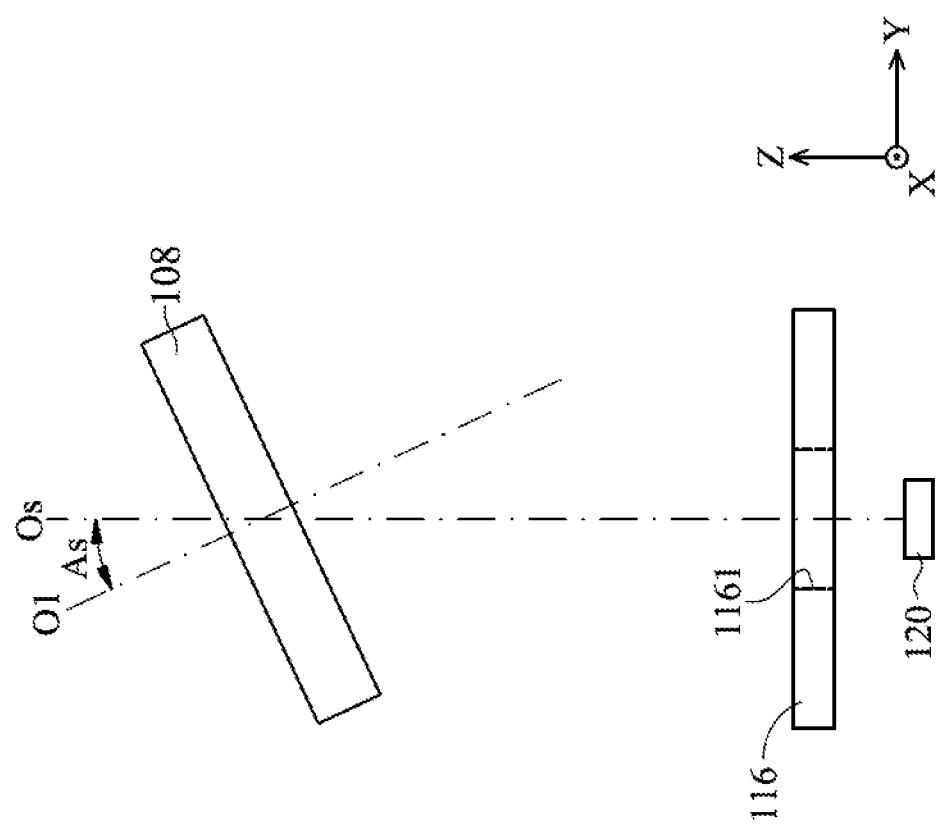
FIG. 6 shows a diagram of the first optical member holder, the base, and the light-sensing module in FIG. 2 according to the embodiment of the disclosure.

Please continue to refer to FIG. 6. FIG. 6 shows a diagram of the first optical member holder 108, the base 116, and the light-sensing module 120 in FIG. 2 according to the embodiment of the disclosure. When the optical system 100 is installed on the main circuit board and is not activated, the first optical axis O1 of the first optical member holder 108 may not be parallel to an optical axis Os of the light-sensing module 120. For example, an included angle As (angle of tilt) is formed between the first optical axis O1 and the optical axis Os. This situation is called a static tilt, and it may result in an unclear image obtained by the light-sensing module 120. Therefore, in order to compensate for this static tilt, the control unit 150 can control the first driving assembly to generate an electromagnetic driving force, so as to rotate the first optical member holder 108 clockwise relative to the first axis Ax (as shown in FIG. 3), so that the included angle As can be compensated for.

Figure 7:
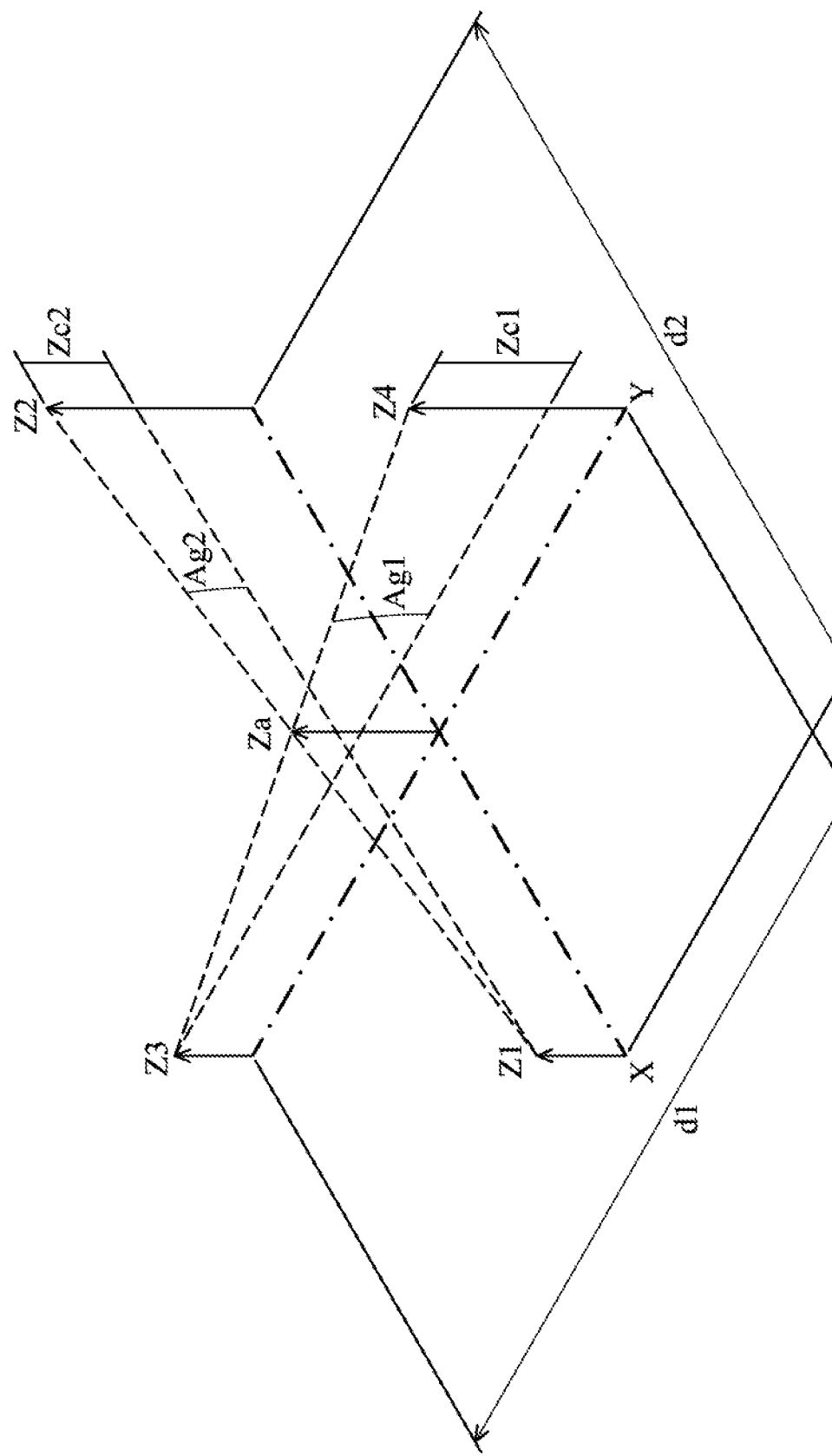
FIG. 7 shows a diagram illustrating that the movement is sensed by the sensing unit in the optical system according to an embodiment of the present disclosure.

Please refer to FIG. 2, FIG. 3 and FIG. 7. FIG. 7 shows a diagram illustrating that the movement is sensed by the sensing unit in the optical system 100 according to an embodiment of the present disclosure. In this embodiment, the magnitudes of the vector Z1 and the vector Z2 respectively represent the displacements of the two second magnetic elements MEG2 along the Z-axis direction which are sensed by the two corresponding first sensors SR1, and the magnitudes of the vectors Z3 and Z4 respectively represent the displacements of the two second magnetic elements MEG2 along the Z-axis direction which are sensed by the two corresponding second sensors SR2. The magnitude of the vector Za represents the displacement of the magnet AM which is sensed by the third sensor SR3.

In this embodiment, the magnitude of the vector Z1 is less than that of the vector Z2, and the magnitude of the vector Z3 is less than that of the vector Z4. Then, the control unit 150 can obtain information about a first rotation angle of the first optical member holder 108 and the inner frame 104 when rotating around the first axis Ax relative to the outer frame 103 or a second rotation angle of the first optical member holder 108 and the inner frame 104 when rotating around the second axis Ay relative to the outer frame 103 according to the magnitudes of the vector Z1 to the vector Z4. For example, a first rotation angle Ag1 can be calculated by a distance d1 between the two second magnetic elements MEG2 along the Y-axis direction and the magnitudes of the vector Z3 and the vector Z4 (according to the trigonometric function formula). Then, the control unit 150 can drive the first optical member holder 108 and the inner frame 104 to rotate around the first axis Ax according to the obtained information about the first rotation angle. That is, the control unit 150 controls the third magnetic element MEG3 corresponding to the vector Z3 to generate an electromagnetic driving force toward the Z-axis direction, to drive the first optical member holder 108 and the inner frame 104 to rotate, so as to move with a compensation distance Zc1. In this embodiment, Z4=Z3+Zc1.

Similarly, the control unit 150 can also obtain a second rotation angle Ag2 of the first optical member holder 108 when rotating around the second axis Ay according to the magnitudes of the vector Z1 and the vector Z2, and correspondingly drive the first optical member holder 108 to rotate, so as to compensate for the second rotation angle. In this embodiment, the control unit 150 can calculate the second rotation angle Ag2 according to a distance d2 between the two second magnetic elements MEG2 along the X-axis direction and the magnitudes of the vector Z1 and the vector Z2 (based on the trigonometric function formula). Then, the control unit 150 can drive the first optical member holder 108 to rotate around the second axis Ay according to the obtained information about the second rotation angle. That is, the control unit 150 controls the third magnetic element MEG3 corresponding to the vector Z1 to generate an electromagnetic driving force toward the Z-axis direction, to drive the first optical member holder 108 and the inner frame 104 to rotate, so as to move with a compensation distance Zc2. In this embodiment, Z2=Z1+Zc2. After the first optical member holder 108 and the inner frame 104 are rotated by the two electromagnetic driving forces described above, the first optical axis O1 of the first optical member holder 108 can be aligned with the optical axis Os of the light-sensing module 120 (as shown in FIG. 6), so as to achieve the purpose of compensating for the tilt.

Figure 8:
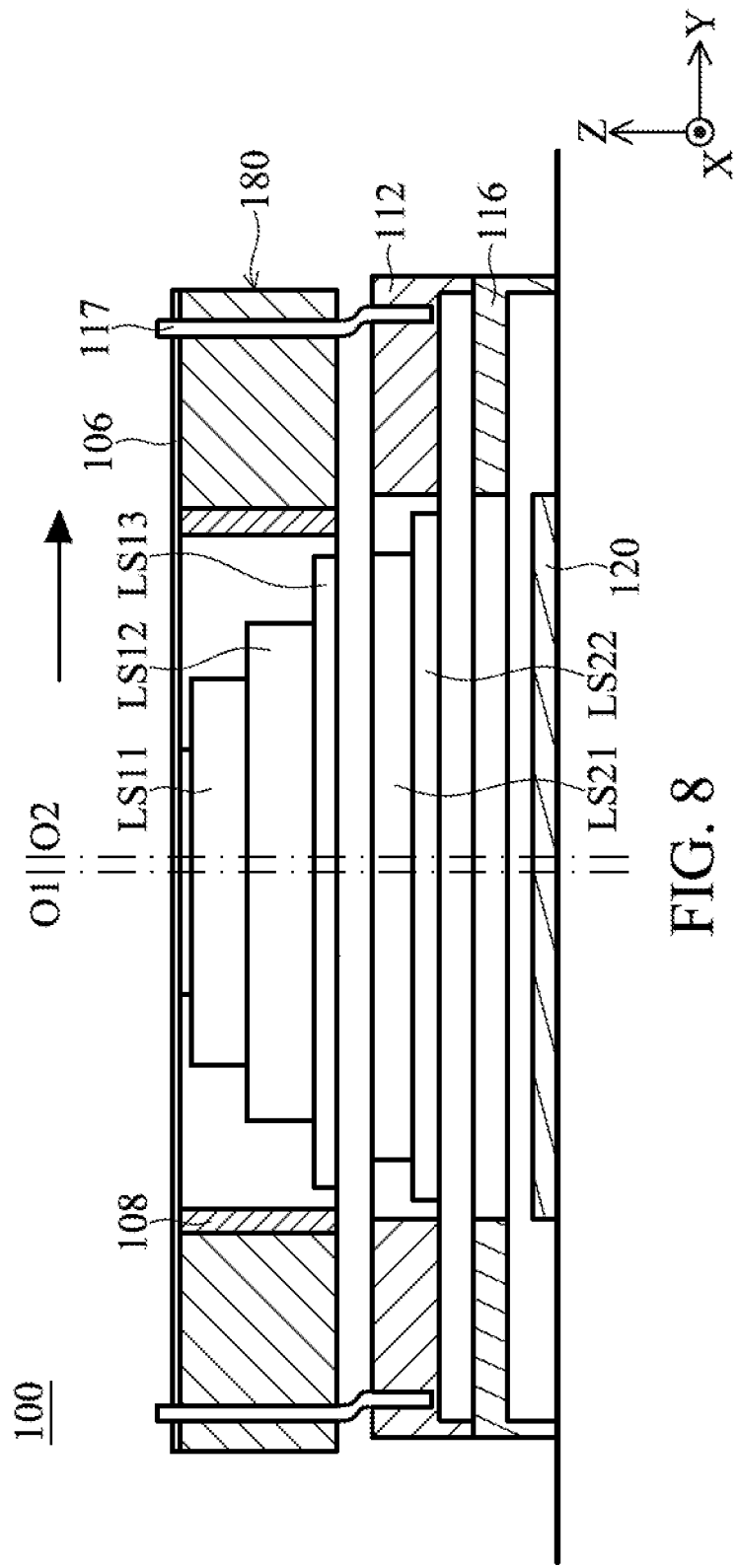
FIG. 8 shows a diagram illustrating that the optical axes of the optical system are deviated according to the embodiment of the present disclosure.

Please refer to FIG. 2 and FIG. 8. FIG. 8 shows a diagram illustrating that the optical axes of the optical system 100 are deviated according to the embodiment of the present disclosure. For clarity of illustration, the outer frame 103, the inner frame 104, and the first optical member holder 108 of the optical system 100 are illustrated as a movable part 180. As shown in FIG. 8, the optical system 100 may have a problem of the deviation of the optical axes due to assembly error. That is, the first optical axis O1 of the first optical members may not be aligned with a second optical axis O2 of the second optical members, and a distance is formed between the first optical axis O1 and the second optical axis O2 along the Y-axis direction. Thus, the digital image generated by the light-sensing module 120 is unclear.

In order to align the first optical axis O1 with the second optical axis O2, the control unit 150 can control the first magnetic elements MEG1 and the second magnetic elements MEG2 of the first driving assembly to generate the electromagnetic driving force along the Y-axis direction, so as to drive the movable part 180 to move along an arrow direction (the Y-axis direction) in FIG. 8, so that the first optical axis O1 is aligned with the second optical axis O2. Therefore, the first optical axis O1 and the second optical axis O2 can be on the same axis.

Figure 9:
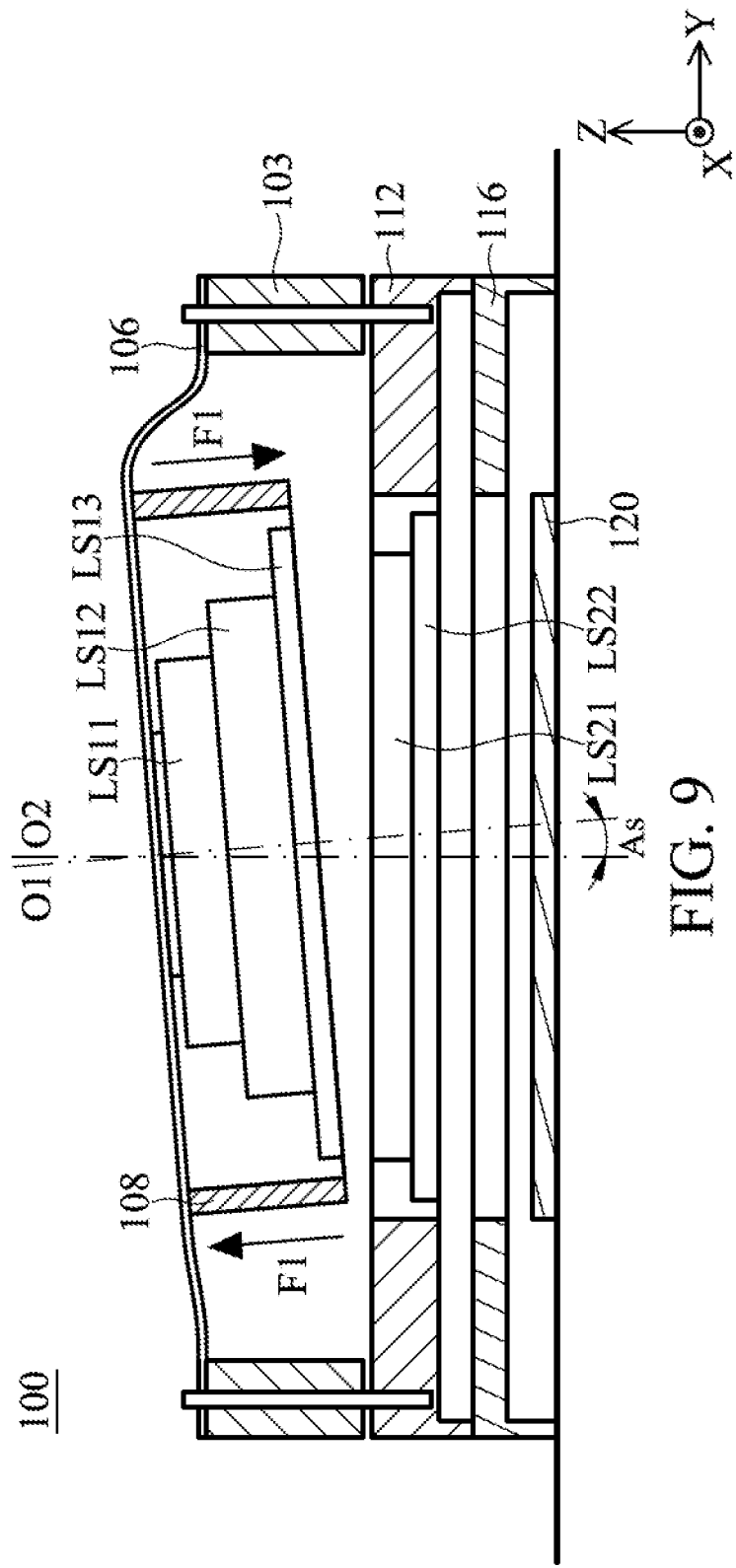
FIG. 9 shows a diagram illustrating that the optical system has a tilt according to the embodiment of the present disclosure.

Please refer to FIG. 9, which shows a diagram illustrating that the optical system 100 has a tilt according to the embodiment of the present disclosure. FIG. 9 only shows some of the members of the optical system 100. Due to the assembly error, an included angle As may be formed between the first optical axis O1 of the first optical members and the second optical axis O2 of the second optical members. As a result, the digital image generated by the light-sensing module 120 is unclear.

In order to compensate for the problem of tilt, the control unit 150 can control the third magnetic elements MEG3 of the first driving assembly arranged along the Y-axis direction to generate two electromagnetic driving forces F1, so as to drive the first optical member holder 108 to rotate relative to the outer frame 103 around the first axis Ax, so that the first optical axis O1 is aligned with the second optical axis O2. In addition, in some embodiments, the optical system 100 may have problems of the tilt and the deviation of optical axes at the same time. At this time, the control unit 150 can control the first driving assembly to drive the first optical member holder 108 to move along the X-Y plane and rotate around the first axis Ax (or the second axis Ay) together, so that the first optical axis O1 is aligned with the second optical axis O2, and they are located on the same axis.

Figure 10:
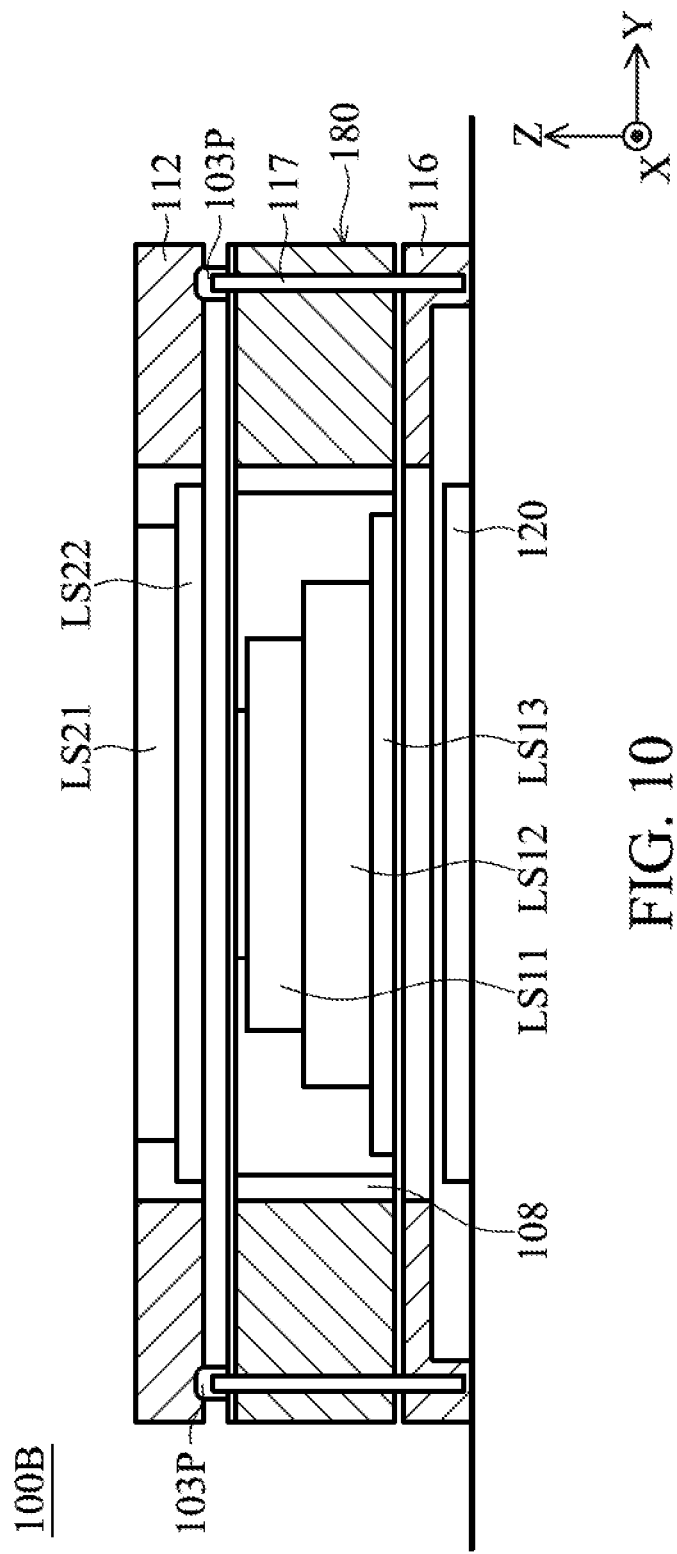
FIG. 10 shows a diagram of an optical system according to another embodiment of the present disclosure.

Please refer to FIG. 10, which shows a diagram of an optical system 100B according to another embodiment of the present disclosure. In this embodiment, the movable part 180 is located between the second optical member holder 112 and the fixed part (the base 116). That is, the first optical members are located between the second optical members and the fixed part.

In addition, the movable part 180 is connected to the second optical member holder 112 through a plurality of protrusions. For example, four protrusions 103P (only two are shown in FIG. 10) can be formed on four corners of the outer frame 103 of the movable part 180, and four recessed holes (not shown in figures) can be correspondingly formed on the bottom of the second optical member holder 112, so that the protrusions 103P can be engaged with the four recessed holes.

Figure 11:
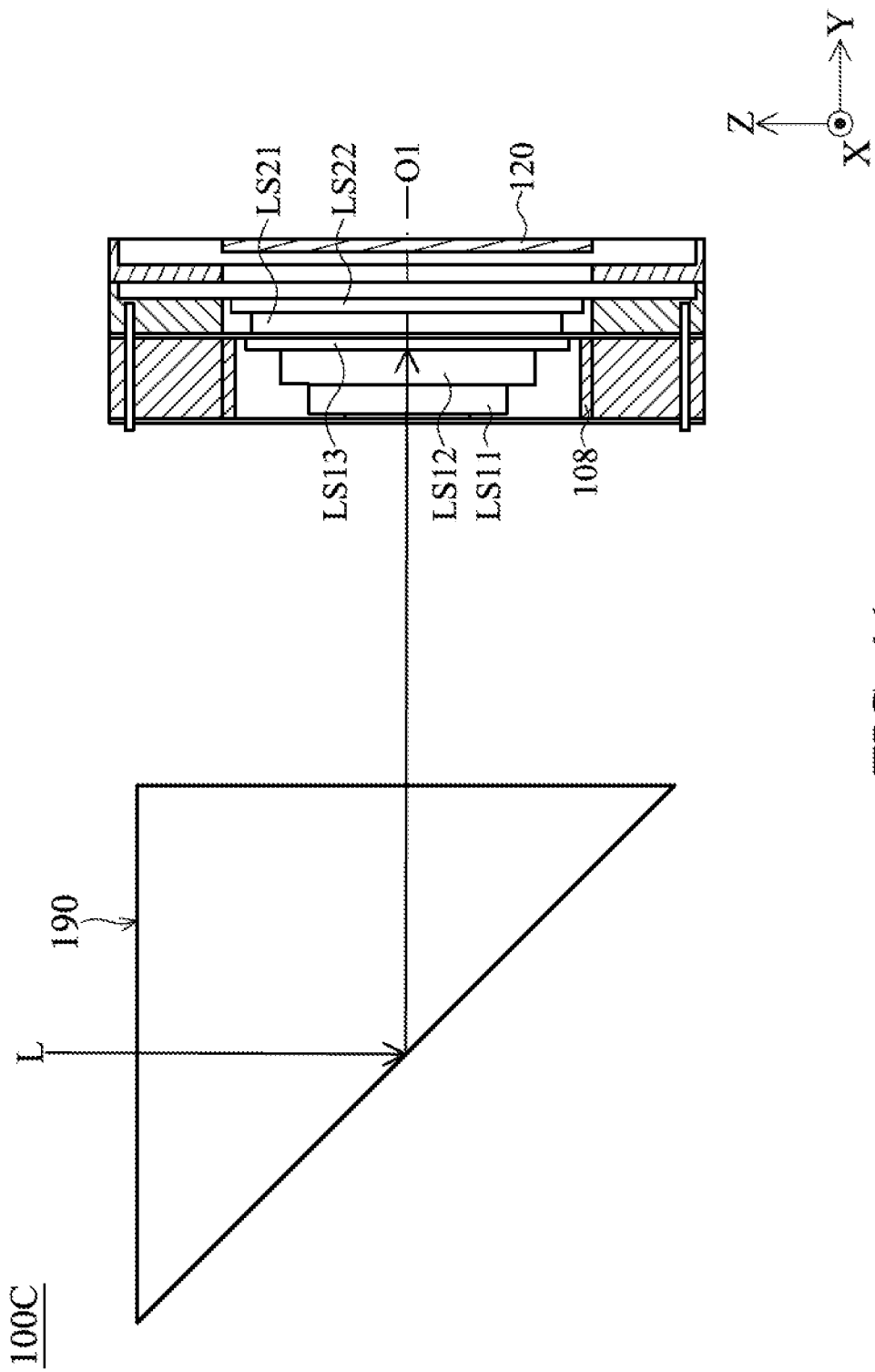
FIG. 11 shows a diagram of an optical system according to another embodiment of the present disclosure.

Please refer to FIG. 11, which shows a diagram of an optical system 100C according to another embodiment of the present disclosure. As shown in FIG. 11, in contrast to the optical system 100, the optical system 100C can include all of the members of the optical system 100, and the optical system 100C further includes an optical path adjustment member 190. In this embodiment, the optical path adjustment member 190 can be a reflecting mirror configured to guide an incident light L along the −Z-axis direction to a direction parallel to the first optical axis O1 direction. In this embodiment, the direction of the incident light L is not parallel to the direction of the first optical axis O1. In this embodiment, the optical path adjustment member 190, the first optical members and the second optical members are arranged along the first optical axis O1 direction.

Figure 12:
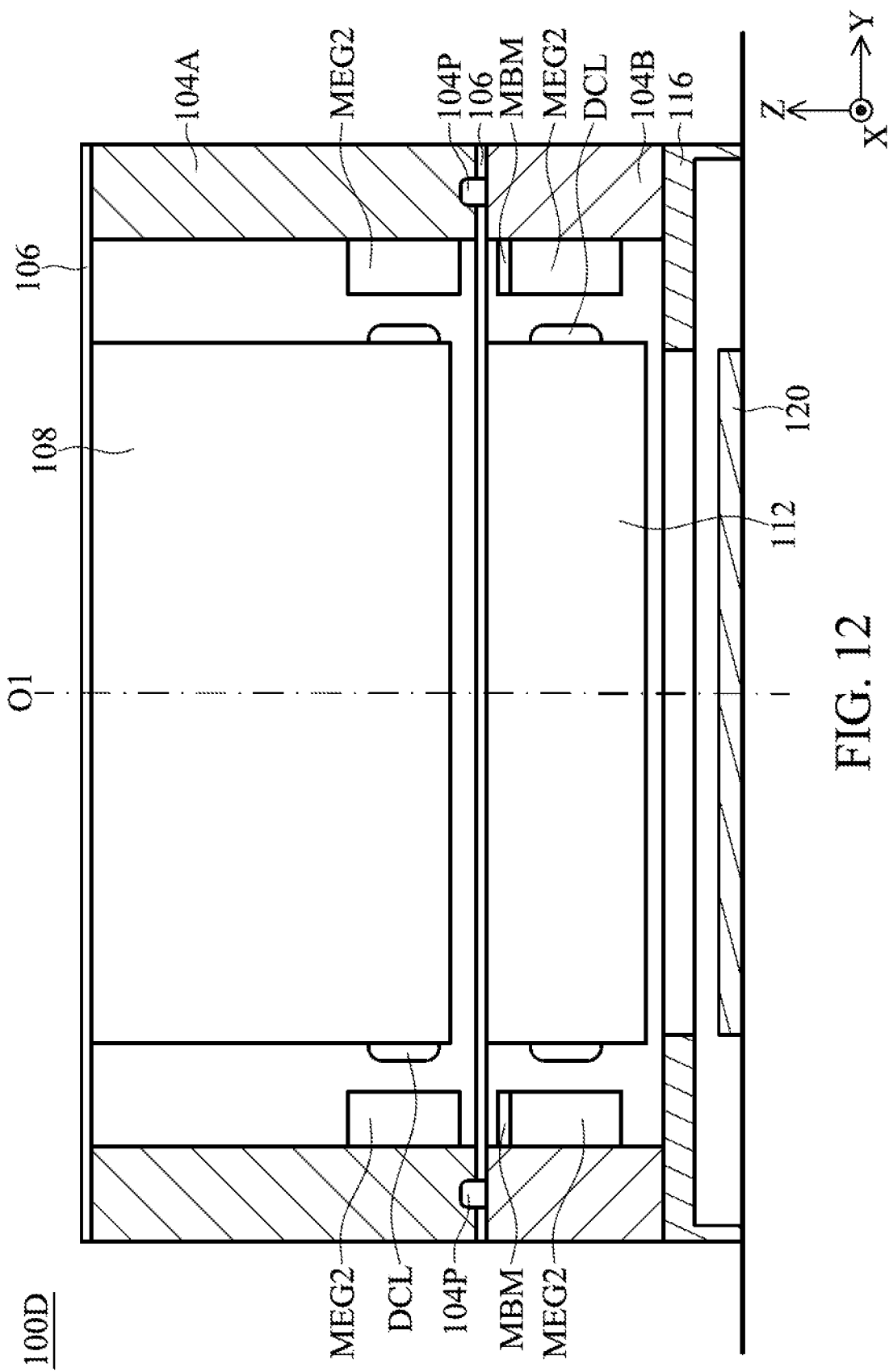
FIG. 12 shows a diagram of an optical system according to another embodiment of the present disclosure.

Please refer to FIG. 12, which shows a diagram of an optical system 100D according to another embodiment of the present disclosure. In this embodiment, the first optical member holder 108 of the optical system 100D is suspended in an inner frame 104A by the top spring sheet 106, and the second optical member holder 112 is suspended in an inner frame 104B by another top spring sheet 106. The inner frame 104A is disposed on the inner frame 104B by engaging structures 104P, and the inner frame 104B is disposed on the base 116. Moreover, in this embodiment, the optical system 100D can further include a second driving assembly configured to drive the second optical member holder 112 to move along the first optical axis O1 direction relative to the fixed part (the base 116).

Similar to the first driving assembly, the second driving assembly can include a driving coil DCL and one or more second magnetic elements MEG2. The driving coil DCL is disposed on the second optical member holder 112, and the second magnetic elements MEG2 are disposed on the inner surface of the inner frame 104B. Based on the structural design of this embodiment, the optical system 100D can also perform auto focusing function while performing the zoom function. In addition, it should be noted that the optical system 100D can include one or more magnetic isolation members MBM which are disposed between the first driving assembly and the second driving assembly, so as to prevent the problem of magnetic interference between the first driving assembly and the second driving assembly.

It should be noted that only some members of the optical system 100D are illustrated in FIG. 12, and the implementations of the first and second driving assemblies are not limited to this embodiment. Any other type of first or second driving assembly capable of driving the first optical member holder 108 and the second optical member holder 112 to move along the first optical axis O1 direction are within the scope of the present disclosure.

Figure 13:
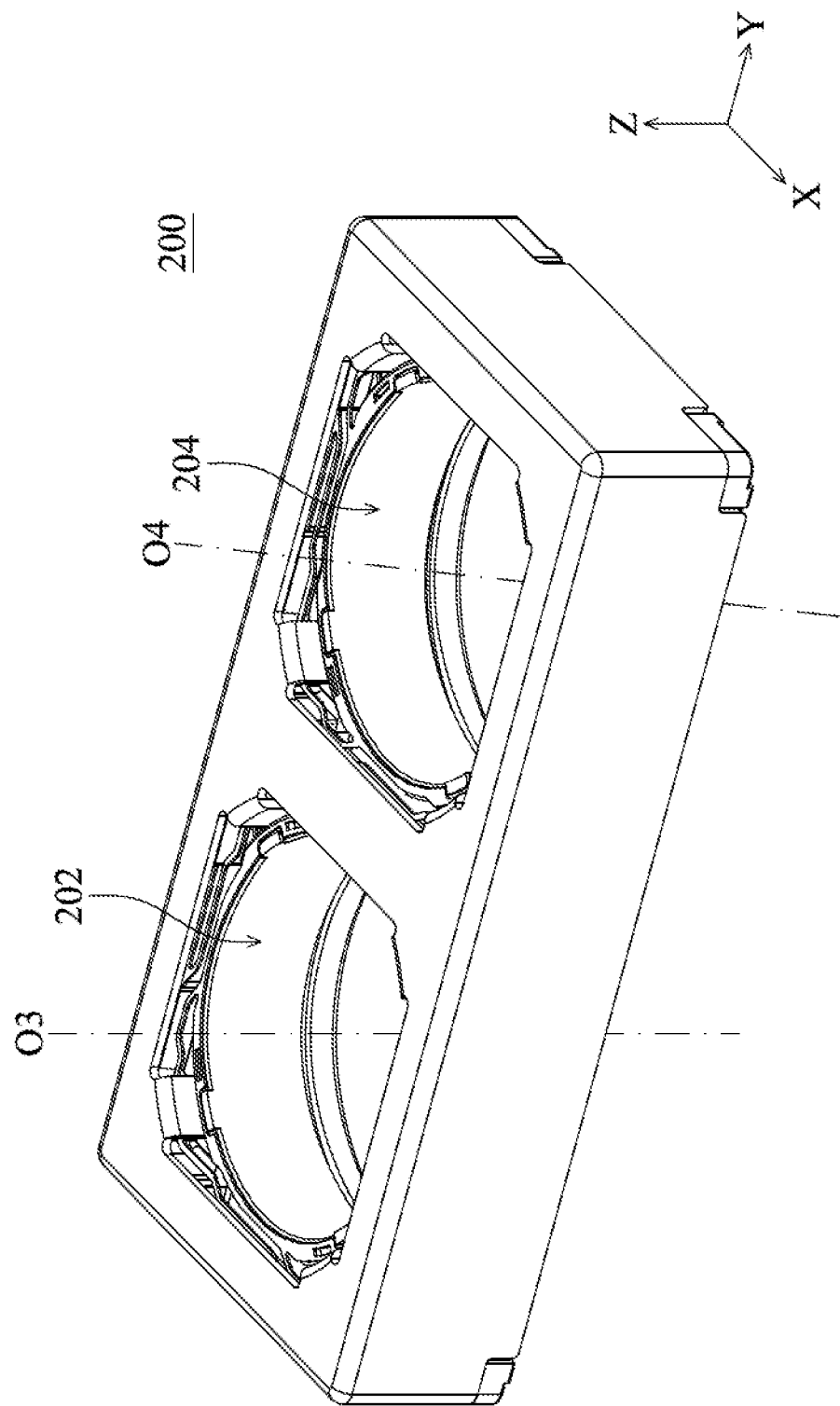
FIG. 13 shows a schematic diagram of an optical system according to another embodiment of the present disclosure.

Please refer to FIG. 13, which shows a schematic diagram of an optical system 200 according to another embodiment of the present disclosure. In this embodiment, the optical system 200 includes an optical module 202 and an optical module 204, and the structures of the optical modules 202 and 204 are similar to the optical system 100. As shown in FIG. 13, the optical module 202 includes an optical axis O3, and the optical module 204 includes an optical axis O4. In this embodiment, the optical axis O3 is parallel to the Z-axis direction, and the optical axis O4 is not parallel to the Z-axis direction. In order to help the optical system 200 to obtain a clearer image, the driving assembly of the optical module 204 (similar to the first driving assembly described above) can control an optical member holder of the optical module 204 to rotate, so that the optical axis O4 can be parallel to the optical axis O3.

In conclusion, the present disclosure provides an optical system that includes a first optical member holder 108, a second optical member holder 112 and a first driving assembly. The first optical member holder 108 and the second optical member holder 112 are configured to respectively hold a plurality of first optical members and a plurality of second optical members. In some embodiments, some of the first optical members are made of plastic material, and the second optical members are made of glass material. Because the first optical members made of plastic are lighter in weight, the first driving assembly can effectively drive the first optical member holder 108 and the first optical members to move relative to the fixed part.

In addition, the first driving assembly is configured to drive the first optical member holder 108 to move along the first optical axis O1 direction and/or to control the distance between the first optical axis O1 of the first optical members and the second optical axis O2 of the second optical members and/or to control the included angle between the first optical axis O1 and the second optical axis O2. Therefore, when the optical system is shaken, the first driving assembly can immediately help the first optical axis O1 to be aligned with the second optical axis O2, so that the light-sensing module 120 can generate a clear digital image, so as to achieve the purpose of optical image stabilization.

In some embodiments of the present disclosure, the optical system can further include a second driving assembly which is configured to drive the second optical member holder 112 to move along the first optical axis O1 relative to the fixed part. Therefore, the optical system can perform the auto focusing function while performing the zoom function. In addition, in this embodiment, the optical system can further include a plurality of magnetic isolation members MBM which are disposed between the first driving assembly and the second driving assembly, so as to prevent the problem of magnetic interference between the first driving assembly and the second driving assembly.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
   a fixed part, comprising a base and a light-sensing module;
   a first optical member holder, configured to hold a first optical member and disposed over the fixed part;
   a second optical member holder, configured to hold a second optical member and movably connected to the first optical member holder;
   a first driving assembly, configured to drive the first optical member holder to move relative to the fixed part;
   a second driving assembly, configured to drive the second optical member holder to move relative to the fixed part; and
   a magnetic isolation member, disposed between the first and second driving assemblies.

2. The optical system as claimed in claim 1, wherein the second optical member holder, the second optical member and the fixed part define an enclosed space, and the enclosed space is located between the second optical member and the light-sensing module.

3. The optical system as claimed in claim 2, wherein the first optical member is located between the second optical member and the fixed part.

4. The optical system as claimed in claim 2, further comprising an elastic member, wherein the first optical member holder is movably connected to the fixed part through the elastic member.

5. The optical system as claimed in claim 4, wherein the elastic member includes a long-strip structure, and the elastic member is extended to be connected to the base along a first optical axis direction of the first optical member.

6. The optical system as claimed in claim 5, wherein when viewed along a direction which is perpendicular to the first optical axis direction, the elastic member partially overlaps the first optical member and the second optical member.

7. The optical system as claimed in claim 1, further comprising an optical path adjustment member, wherein the optical path adjustment member, the first optical member and the second optical member are arranged along a first optical axis direction of the first optical member.

8. The optical system as claimed in claim 1, wherein the first driving assembly is configured to drive the first optical member holder to move along a first optical axis direction of the first optical member.

9. The optical system as claimed in claim 1, wherein the first driving assembly is configured to control a distance between a first optical axis of the first optical member and a second optical axis of the second optical member.

10. The optical system as claimed in claim 1, wherein the first driving assembly is configured to control an included angle between a first optical axis of the first optical member and a second optical axis of the second optical member.

11. The optical system as claimed in claim 1, further comprising a plurality of first optical members, disposed on the first optical member holder.

12. The optical system as claimed in claim 11, further comprising a plurality of second optical members, disposed on the second optical member holder.

13. The optical system as claimed in claim 12, wherein the second optical members are bigger than the first optical members.

14. The optical system as claimed in claim 11, wherein some of the first optical members are made of plastic material.

15. The optical system as claimed in claim 14, wherein some of the first optical members are made of glass material.

16. The optical system as claimed in claim 1, further comprising a light quantity control unit, disposed between the first optical member holder and the second optical member holder.

* * * * *